(12) United States Patent
Tang et al.

(10) Patent No.: US 11,314,547 B1
(45) Date of Patent: Apr. 26, 2022

(54) BACKGROUND TASK SCHEDULING BASED ON SHARED BACKGROUND BANDWIDTH

(71) Applicant: Amazon Technologies, Inc., Seattle, WA (US)

(72) Inventors: Kun Tang, Bellevue, WA (US); Avram Israel Blaszka, Seattle, WA (US); Jianhua Fan, Issaquah, WA (US); Oscar Alberto Arias Rios, Mountlake Terrace, WA (US)

(73) Assignee: Amazon Technologies, Inc., Seattle, WA (US)

( * ) Notice: Subject to any disclaimer, the term of this patent is extended or adjusted under 35 U.S.C. 154(b) by 222 days.

(21) Appl. No.: 16/832,982

(22) Filed: Mar. 27, 2020

(51) Int. Cl.
*G06F 9/48* (2006.01)
*H04L 67/1097* (2022.01)

(52) U.S. Cl.
CPC ........ *G06F 9/4818* (2013.01); *H04L 67/1097* (2013.01)

(58) Field of Classification Search
CPC .......................... G06F 9/4818; H04L 67/1097
See application file for complete search history.

(56) References Cited

U.S. PATENT DOCUMENTS

| | | | | |
|---|---|---|---|---|
| 7,146,439 B1 * | 12/2006 | Ofer | ...................... | G06F 3/0611 710/45 |
| 11,003,491 B1 * | 5/2021 | Gasser | .................... | H04L 43/02 |
| 2013/0067162 A1 * | 3/2013 | Jayaraman | ............ | G06F 3/0631 711/114 |
| 2015/0326481 A1 * | 11/2015 | Rector | ................ | H04L 12/6418 370/236 |
| 2016/0092108 A1 * | 3/2016 | Karaje | .................. | G06F 9/5027 718/103 |
| 2016/0092272 A1 * | 3/2016 | Karaje | .................... | G06F 3/061 718/104 |
| 2021/0311783 A1 * | 10/2021 | Lee | ......................... | G06F 9/448 |

FOREIGN PATENT DOCUMENTS

| | | | | |
|---|---|---|---|---|
| CN | 110781145 A | * | 2/2020 | |
| JP | 5500256 B2 | * | 5/2014 | ........... G06F 3/0683 |
| WO | WO-2019235772 A1 | * | 12/2019 | ............. G06F 9/448 |

* cited by examiner

*Primary Examiner* — Shean Tokuta
(74) *Attorney, Agent, or Firm* — Nicholson De Vos Webster & Elliott LLP

(57) ABSTRACT

Techniques for background task scheduling based on shared background bandwidth are described. A method for background task scheduling based on shared background bandwidth may include receiving a request to perform one or more background tasks on a storage server of a storage service in a provider network, determining a priority of each of the one or more background tasks, wherein each background task is associated with a size parameter and a temporal parameter, and wherein the priority of each of the one or more background tasks is based at least on its associated size parameter and temporal parameter, determining a task type associated with each background task, adding each background task to one of a plurality of task queues associated with different task types, wherein each task queue is associated with a bandwidth allocation, and scheduling the one or more background tasks to be performed based on their priority and the bandwidth allocation.

20 Claims, 8 Drawing Sheets

400

```
struct SchedInfo
{
    u64 max_duration;
    u64 remaining_size;
    u64 deadline;
};
```

402

```
struct SchedItem
{
    u64 sched_priority;
    u64 request_size;
    AsyncCallback* async_callback
};
```

*FIG. 4*

BACKGROUND TASK SCHEDULING BASED ON SHARED BACKGROUND BANDWIDTH

BACKGROUND

Multi-tenant systems host multiple customers on a shared resource. This increases the utilization of the multi-tenant resources, but also requires the customers sharing the resource to share the performance of that resource. These shared resources host customer workloads, which may be referred to as foreground tasks, and management tasks, which may be referred to as background tasks. If one customer utilizes a large portion of a resource (e.g., CPU, GPU, bandwidth, etc.), the remaining portion of that resource is available for the other customers sharing it. For example, a server of a storage service may have a limited bandwidth for performing various tasks. This bandwidth will be shared among customer input/output requests and management tasks performed by the storage service.

BRIEF DESCRIPTION OF DRAWINGS

Various embodiments in accordance with the present disclosure will be described with reference to the drawings, in which:

FIG. 4 illustrates an example data structure for background scheduling according to some embodiments.

DETAILED DESCRIPTION

The present disclosure relates to methods, apparatus, systems, and non-transitory computer-readable storage media for background task scheduling based on shared background bandwidth. According to some embodiments, the available bandwidth of a block storage server (e.g., as determined based on the network interface card (NIC) of a given server) may be split between "foreground tasks" (e.g., client input/output (I/O) requests) and "background tasks" (e.g., workflows for transferring volume data that are managed by the block storage service rather than workflows for serving customer requested I/O, such as creating a storage volume from an image stored in another storage service, replicating data to another block storage server, capturing snapshots of storage volumes and sending the snapshot data to another storage service, etc.). While customer data volumes stored on the block store server may each have a dedicated amount of bandwidth for the foreground tasks, a remaining pool of the server's bandwidth can be shared amongst the volumes for background tasks. Embodiments use a background scheduler to prioritize the use of the shared background bandwidth among the various background tasks performed by a block storage server.

Typically, background tasks compete for the shared background bandwidth. As background tasks are executed, they may be added to a queue and are most commonly processed in a first-in, first-out (FIFO) strategy. However, such a processing strategy treats the I/O requests of the background tasks equally, when some background tasks may need to be processed more urgently than others, to ensure quality of service, performance, high-availability, or other service guarantees. To address these and other issues, a block storage server may include a background scheduler, which can manage the bandwidth consumed by different background tasks based, e.g., on the type of background task, size of background task, and/or deadline associated with the background task. The background scheduler can ensure that background tasks do not exceed their assigned bandwidth when multiple background tasks are competing for bandwidth but may also enable a background task to use additional available bandwidth when no other background tasks are competing for resources. In some embodiments, the scheduler may maintain multiple task queues, each associated with a different background task type, to ensure that some task types are prioritized over other task types. By prioritizing background tasks, new instances launch faster and more reliably as boot volumes are obtained consistent with performance guarantees. Additionally, larger volumes can be guaranteed to have high durability volumes because prioritizing bandwidth for the high durability volume replication background task allows for larger volumes to be replicated in the guaranteed performance time.

Figure 1:
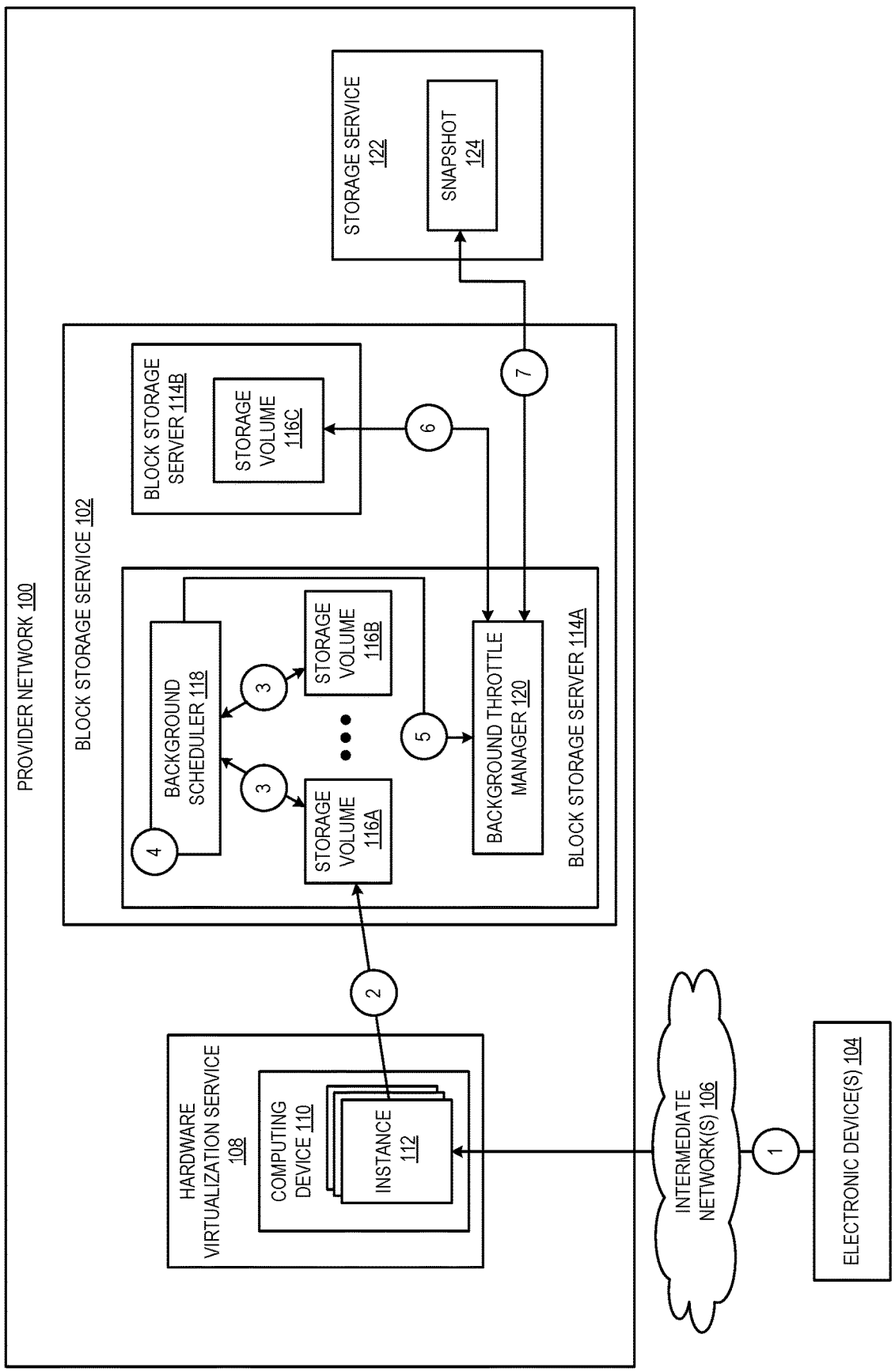
FIG. 1 is a diagram illustrating an environment for background task scheduling based on shared background bandwidth according to some embodiments.

FIG. 1 is a diagram illustrating an environment for background task scheduling based on shared background bandwidth according to some embodiments. A provider network 100 can include a block storage service 102 (referred to in various implementations as cloud disks service, a managed disk service, a storage area network service, a persistent disk service, or a block volumes service) that provides persistent block storage volumes (for example, storage volumes 116A-C) for use with various types of compute instances and other computing resources in the provider network 100. The block storage service 102 can include a number of servers or nodes on which data is stored as blocks. A block is a sequence of bytes or bits, usually containing some whole number of records, having a maximum length of the block size. Blocked data is normally stored in a data buffer and read or written a whole block at a time. Each block of data is assigned a unique identifier by which it can be stored and retrieved. A block of data (also referred to herein as a "block") can be, for example, 512 bytes, 1 kilobyte ("kB"), 4 kB, 8 kB, 16 kB, 32 kB, 64 kB, 128 kB, 256 kB, 512 kB, or larger, depending upon the implementation.

In general, each storage volume can provide any amount of storage capacity depending on a customer's needs (for example, a provider network 100 may provide storage volumes ranging from 1 GB to 16 TB in size or any other range). Once a storage volume is created at a block storage service 102, it can be attached to a compute instance (for example, instance 112 hosted by a computing device 110 managed by a hardware virtualization service 108 (referred to in various implementations as an elastic compute service, a virtual machines service, a computing cloud service, a compute engine, or a cloud compute service)). Once a storage volume 116A is attached to a compute instance, the volume appears to the compute instance as a mounted device similar to any hard drive or other block device. At that point, a compute instance can interact with the volume just as it would with a local drive, formatting it with a file system or installing applications on it directly and performing reads and writes on the storage volume. In response to requests from one or more electronic devices 104, at numeral 1, the instance 112 may perform various customer workloads (e.g., reads and writes) on the storage volume 16A, at numeral 2. These customer workloads may be referred to herein as foreground activities. Although treated as an individual hard drive, it will be appreciated that a volume may be stored as one or more virtualized devices implemented on one or more underlying physical host devices. Volumes may be partitioned a number of times (e.g., up to 16) depending upon their size, with each partition hosted by a different block storage server, and with each partition being replicated across multiple nodes.

Typically, a storage volume 116 is attached to only one compute instance at a time, but many storage volumes 116 can be attached to a single compute instance. However, in some cases, a single storage volume 116 can be attached to two or more separate compute instances either permanently or temporarily (for example, during a process for migrating a compute instance from one computing device to another). In some embodiments, a storage volume 116 can be used as a boot partition for a compute instance 112, which enables users to preserve boot partition data beyond the life of a compute instance 112. In some embodiments, a single storage volume 116 can be stored as multiple partitions across two or more separate storage servers 110. In this case, a computing device 110 hosting a compute instance that attaches a storage volume 116 stored across multiple storage servers 114 can establish a separate connection with each of the respective storage servers and can manage I/O interactions with the storage volume for the compute instance. A block storage server 114A-B can host any number of separate storage volumes 116A-C, which can be stored at any number of underlying storage devices (for example, on hard disk drives (HDDs), solid-state drives (SSDs), or any other type of storage devices or combinations thereof). In some examples, a storage volume can also be stored across one or more separate storage servers.

In addition to the foreground tasks described above, each block storage server may perform various background tasks. The background tasks may include creating storage volumes from disk images stored in a network-connected location, e.g., storage service 122, replicating data from one storage volume on one block storage server to another storage server, capturing and storing snapshots of the storage volumes, etc. Each server has limited bandwidth to perform the foreground and background tasks. As such, a portion of the server's bandwidth may be reserved for foreground tasks and another portion of the server's bandwidth may be reserved for background tasks. As discussed, background tasks include various management tasks to ensure a certain quality of service, performance, high-availability, etc. As such, embodiments provide a background scheduler on each block storage server which prioritizes usage of the bandwidth available to background tasks to ensure particular types of background tasks are prioritized over others.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network, etc.) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

In some embodiments, various background tasks associated with storage volumes 116A and 116B may be executed. These background tasks may be triggered by block storage service 102 and/or by an administrator or other entity who controls the storage volumes. At numeral 3, these background tasks can register with background scheduler 118. When registering with the background scheduler, the background task can indicate how much data remains to be processed for the background task (e.g., an amount of data to be transferred, copied, replicated, etc.) and a deadline by which the background task is to be completed. The background scheduler may maintain a plurality of priority queues in which the background tasks are queued. In some embodiments, each priority queue may correspond to a different type of background task. In some embodiments, one queue may be maintained for one type of background task and a second queue may be maintained for all other types of background tasks. For example, one queue may be maintained for replication background tasks and another queue may be maintained for all other tasks. Additional priority queues may be added for more background tasks. Background bandwidth can be allocated among the priority queues such that particular types of tasks are allocated, at minimum, specific portion of the background bandwidth.

In some embodiments, a background task may include transferring volume data from a data source into a block storage volume. This data may be transferred from a replica of the storage volume on another block storage server, in a storage location in storage service, etc. In some embodiments, particular portions (e.g., chunks) of the volume data may be needed to speed up instance launch time. As such, by prioritizing these portions of the volume data, the instances may be launched faster, providing more consistent instance launch times. In some embodiments, a separate priority queue may be maintained for background tasks that are transferring these portions of volume data. Alternatively, these background tasks may be associated with a shorter maximum job duration, as discussed further below.

At numeral 4, the background scheduler 118 can poll the server to determine resource availability (e.g., current bandwidth availability). If there are enough resources, then at numeral 5 the background scheduler can dequeue tasks from the plurality of queues based on the background tasks' priorities and send them to the background throttler 120 for processing. In some embodiments, the background scheduler 118 and/or background throttle manager 120 can be implemented on an offload card, on the block storage server hypervisor, or on the physical host. In some embodiments, as discussed, priority can be calculated based at least in part on the job size. Each background task is associated with a job size. For example, at numeral 6, a volume may be replicated to another server 114B. In such an instance, the size of the volume being replicated is known and corresponds to the size of the job. Similarly, at numeral 7, a snapshot 124 of a volume may be stored to another storage location, such as storage service 122. In this example, the size of the snapshot, which may include only those blocks that have changed since a previous snapshot, is known when the job starts, and corresponds to the job size. In addition to the job size, the priority may also be based on a temporal parameter (e.g., a deadline) which specifies when the job needs to be complete. The priority of a given job can then be determined by dividing the job size by the remaining time (e.g., in seconds, hours, etc.) to complete the job to obtain a throughput needed to complete the job on time. As such, based on the deadline and the amount of data then the background scheduler 118 can compute the priority. If the deadline is already passed, then the priority can be calculated such that it increases linearly as the time exceeding the deadline increases. This will prioritize the latest tasks with the shortest deadlines.

Figure 2:
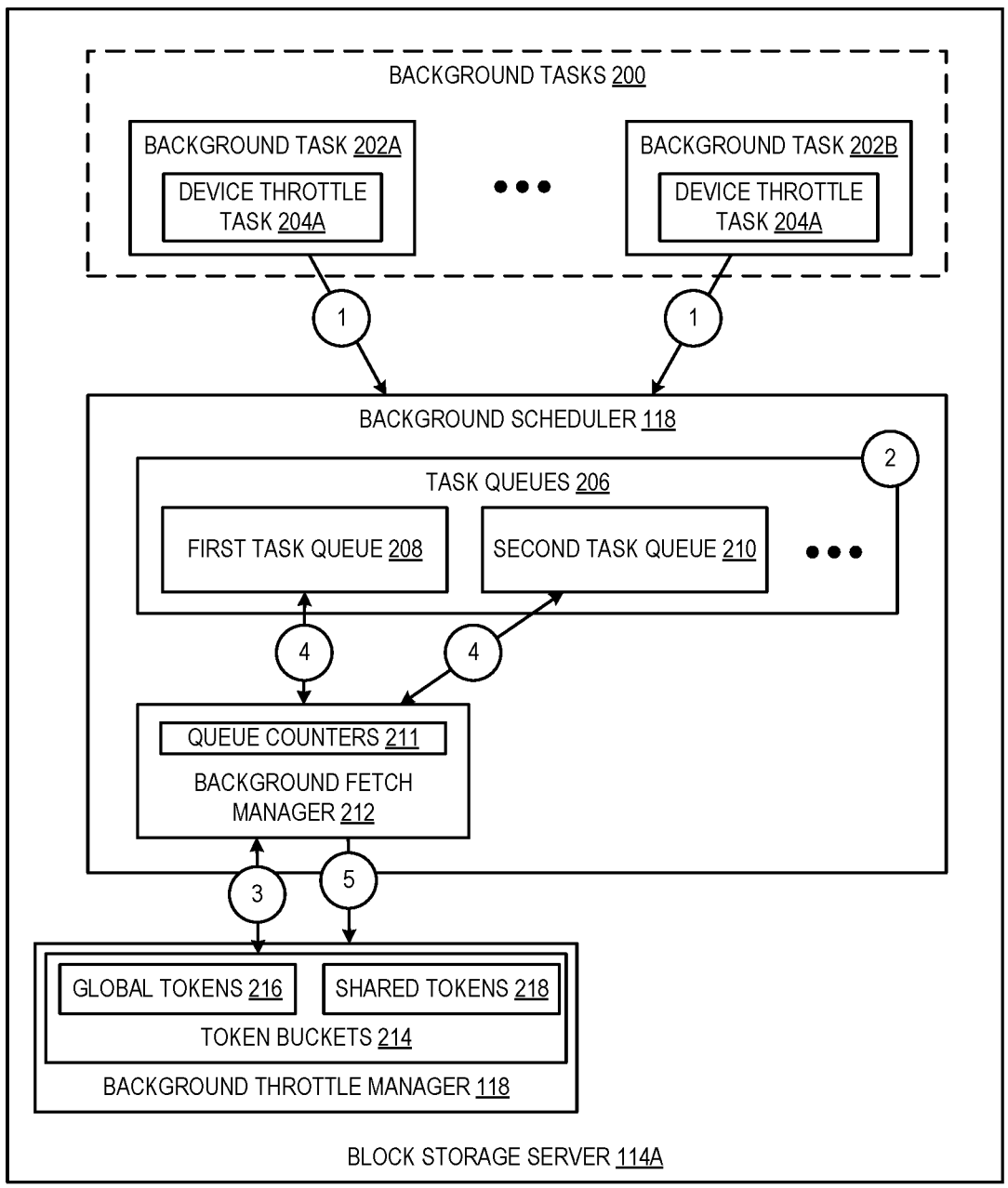
FIG. 2 is a diagram illustrating background scheduling and throttling according to some embodiments.

FIG. 2 is a diagram illustrating background scheduling and throttling according to some embodiments. As shown in FIG. 2, various background tasks 200 may be triggered by block storage server 114A, block storage service 102, a customer, an administrator, or other entity. Each background task 202A-202B may include a corresponding device throttle task 204A-204B. The device throttle task may manage providing the I/O requests associated with its corresponding background task to the background scheduler 118 to be enqueued, at numeral 1. In some embodiments, the device throttle task can maintain a data structure for its corresponding background task that defines the remaining size of the job and the remaining time to complete the job. This data structure can be passed with the I/O requests to the background scheduler 118 to be used to determine the priority of the I/O requests for the background task. An updated data structure may be passed with each I/O request or batch of I/O requests, where the device throttle task deducts the amount of the current I/O from the remaining job size. In some embodiments, this data structure can be maintained by the background scheduler.

At numeral 2, the background scheduler 118 enqueues the I/O requests received from a background task in one of a plurality of task queues 206. As discussed, the background scheduler may maintain multiple priority queues. This enables the background scheduled to enqueue traffic associated with different types of tasks into different queues. For example, first task queue 208 may include traffic for replication background tasks and second task queue 210 may include traffic for all other types of background tasks (e.g., snapshotting, volume creation, etc.). By using different queues for different types of tasks, the background scheduler can ensure that each queue is allocated a specific portion of the available bandwidth. Although two queues are shown in FIG. 2, in various embodiments more queues may be maintained depending on performance considerations and how many types of tasks are to receive specific bandwidth allocations.

Background scheduler 118 may also include a background fetch manager 212. Background fetch manager 212 can control dequeuing traffic from the queues and ensuring that each queue is allocated a particular bandwidth. In some embodiments, the background scheduler may have an allocation policy set by an administrator, the block storage service, or other entity that specifies the bandwidth allocation for each task queue maintained by the background scheduler. For example, if first task queue 208 is to receive 60% of the available background bandwidth and second task queue 210 is to receive 40% of the available background bandwidth, then the background fetch manager 212 can fetch a first number I/O requests from the first task queue and a second number of I/O requests from the second task queue, such that a ratio of the accumulated I/O size fetched from each queue is 60/40. For example, if all I/O requests are the same size, then six I/O requests can be fetched from the first queue for every four that are fetched from the second queue. If I/O requests are different sizes, then more or fewer requests may be fetched from each queue such that the accumulated I/O size fetched from each queue satisfies the bandwidth allocation ratio. In some embodiments, the background fetch manager 212 can maintain queue counters 211 corresponding to each queue that are updated each time an I/O request is fetched from a task queue. If the data processed by the background fetch manager 212 from the task queues 206 comes out of the specified ratio, based on the counter values, then the background fetch manager can preferentially fetch from the appropriate task queue to return processing to the specified ratio. In some embodiments, if one queue is empty and then new work is added to it, then the counters in the background fetch manager 212 are reset, and the background fetch manager fetches I/O requests from the queues according to the specified ratio. In some embodiments, if one queue is empty, the portion of the background bandwidth that was allocated to it can be reallocated to the other queue(s). For example, if there are two queues, and one queue is empty, then the other queue can use all of the background bandwidth. If there are three queues, and one queue is empty then the bandwidth that was allocated to the empty queue can be reallocated according to the bandwidth allocation of the remaining queues. For example, if the three queues, q1, q2, q3, have a bandwidth allocation ratio of 1:2:3, than as long as queue q1 is empty, the background fetch manager can allocate bandwidth to q2 and q3 with an allocation ratio of 2:3. Bandwidth may similarly be reallocated among more than three queues if one or more of the queues are empty.

In some embodiments, before the background fetch manager 212 fetches I/O requests from the task queues to be processed, the background fetch manager can determine whether there are available resources to process the request by checking token buckets 214 at numeral 3. Token buckets 214 can include a global token bucket 216 which includes tokens shared by all background tasks, and a shared tokens bucket 218 which allows background tasks to use foreground bandwidth when there is not much foreground workload. In some embodiments, tokens are added to each token bucket according to a refill rate. The refill rate may be different for different token buckets and/or may vary depending on current resource usage of the block storage server. In order for the background fetch manager to process requests from the task queues, there must be sufficient tokens in one or more of the token buckets for the requests. Tokens are removed from the buckets as requests are processed based on the size of the requests processed. If the buckets run out of tokens, then further requests cannot be processed by the background fetch manager until tokens are refilled.

In some embodiments, first task queue 208 may correspond to replication tasks and second task queue 210 may correspond to all other background tasks. Let size_r represent the accumulated I/O size of replication tasks and size_o represent the accumulated I/O size of other background tasks. Size_r and size_o are incremented when I/O is fetched from the corresponding queues. Size_r and size_o are reset when there are no background tasks. The background fetch manager can dequeue items from the queues if the global token bucket has sufficient tokens, where requests are fetched according to the ratio size_r:size_o. If the global token bucket has insufficient tokens, but the background shared token bucket has sufficient tokens, then I/O requests are fetched from both queues according to the ratio size_r: size_o. If there are insufficient tokens in either token bucket, then processing waits until sufficient tokens are added and then requests may be fetched according to the ratio size_r: size_o. For example, if x % of bandwidth is assigned to replication tasks and 1−x % of bandwidth is assigned to other background tasks, then the background fetch manager will fetch I/O requests from the queues based on a size ratio of x:(1−x). If size_r:size_o<=x:(1−x), then the background fetch manager fetches from the replication queue, otherwise it fetches from the other queue for other background tasks.

When the background fetch manager dequeues an I/O request at numeral 4, a callback can be executed and the dequeued I/O requests can be passed to background throttle manager for execution at numeral 5. In some embodiments, the background fetch manager is a service task which is started when I/O requests are enqueued in background scheduler 118. The background fetch manager service task loops until the task queues are empty and then stops. If token buckets do not have sufficient tokens, the background fetch manager loops with sleep. Sleep time may be calculated based on the number of tokens needed to process queued requests and the token bucket fill rate(s).

Figure 3:
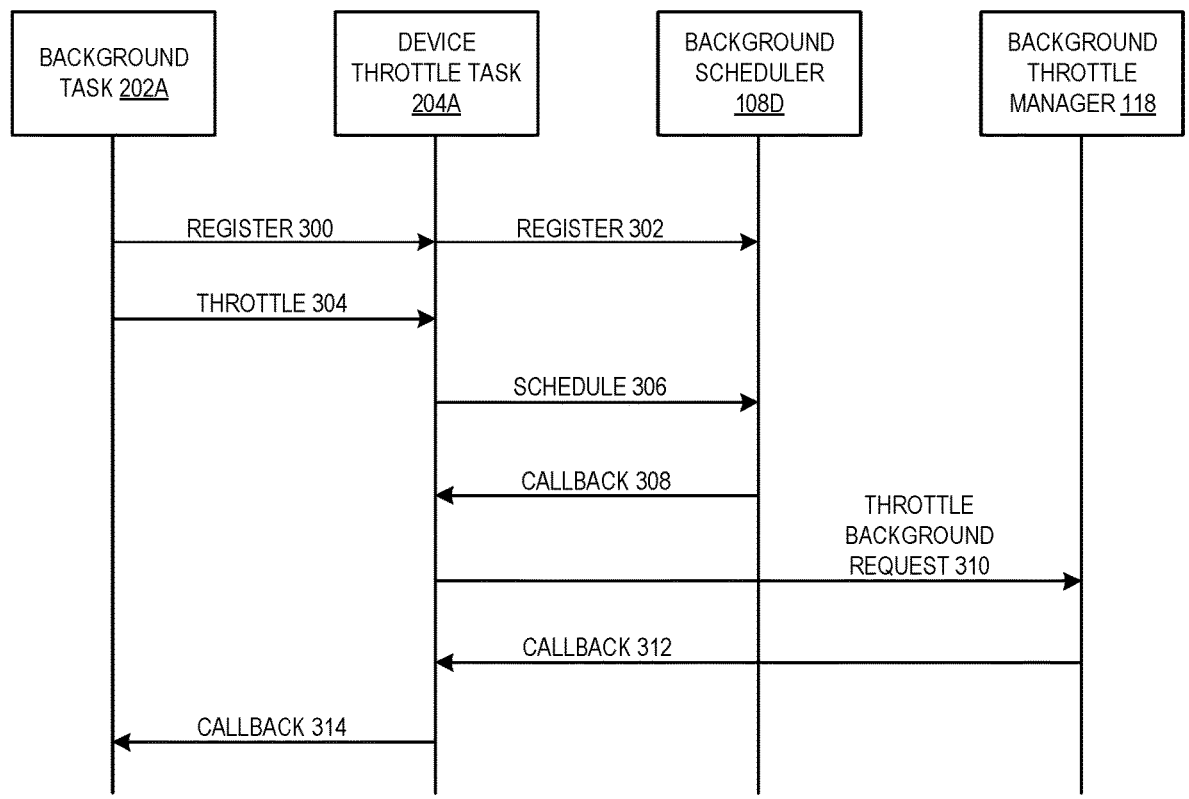
FIG. 3 is a diagram illustrating a call flow for background scheduling and throttling according to some embodiments.

FIG. 3 is a diagram illustrating a call flow for background scheduling and throttling according to some embodiments. As shown in FIG. 3, when a background task starts at 300 it can register with its device throttle task. The device throttle task can then register 302 with the background scheduler. This may include providing a total job size and max duration associated with the background task. The background task can then call the device throttle task 304 before performing I/O for the background task. The device throttle task can send a schedule 306 request to the background scheduler. This can be an asynchronous call and may include the remaining job size and duration. The background scheduler can enqueue the I/O for the background task after receiving the schedule request 306. When the I/O is dequeued by the background scheduler, it can send a callback 308 to the device throttle task. After scheduler calls back, device throttle task sends a throttle background request 310 to the background throttle manager to execute the dequeued I/O. Once the I/O has been executed, the background throttle manager can send a callback 312 to the device throttle task and the device throttle task can send a callback 314 to the background task. The processing from throttle 304 to callback 314 can loop until the background task is completely processed.

FIG. 4 illustrates an example data structure for background scheduling according to some embodiments. As discussed above, the background scheduler may prioritize background tasks based on the job size and duration of each background task. In order to determine the priority of a given background task, the background task can provide a data structure, such as SchedInfo 400, which includes this information. As shown in FIG. 4, SchedInfo may include a temporal parameter, max_duration, a size parameter, remaining_size, and a deadline. Max_duration may define a maximum amount of time that the background task should take to complete. This may be defined based on volume types. For example, a durable volume type may require a replication background task to finish in five minutes. Based on the max_duration, the background scheduler can calculate when the background task should finish, e.g., the deadline parameter. Remaining_size is the total size of data remaining to be transferred by the background task, which is determined at the start of the background task and updated in each throttle call.

As discussed, the background scheduler maintains multiple task queues, such as a first task queue for replication tasks and a second task queue for other background tasks. During processing, I/O with a highest priority to be dequeued first in each queue, rather than the traditional first-in, first-out processing. Each enqueued I/O may be associated with data structure called SchedItem 402 which includes the determined priority for the I/O (e.g., sched_priority), the request size, and a callback function to call when the request is dequeued.

In some embodiments, using the SchedInfo data structure, a priority for each task can be calculated. For example, if deadline>current_time, then sched_priority=MIN(remaining_size/(deadline−current_time), MAX_THROUGHPUT). In this example, MAX_THROUGHPUT is a constant, which can be set based on the network interface card speed of the block storage server. Priority reflects the throughput needed by the background task, and a higher value has higher priority in scheduler. If deadline<=current_time, sched_priority=MAX_THROUGHPUT+(current_time−deadline)/max_duration. As such, if a background tasks misses its deadline, then its priority increases linearly as time elapses. The linear increase will vary between task types depending on the value of max_duration. For example, a high durability volume priority increases faster than a low durability volume priority due to the difference in max_duration between these task types. For tasks with the same priority, background scheduler uses FIFO strategy.

Figure 5:
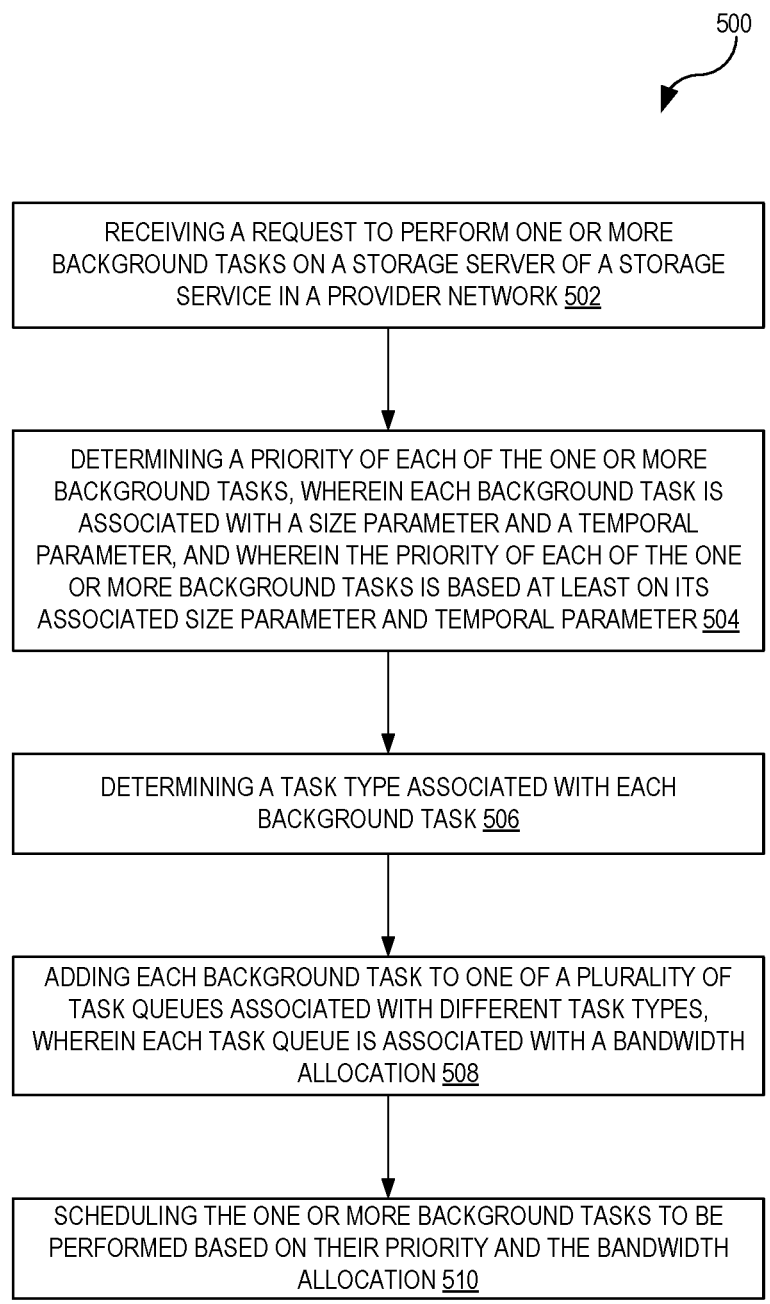
FIG. 5 is a flow diagram illustrating operations of a method for background task scheduling based on shared background bandwidth according to some embodiments.

FIG. 5 is a flow diagram illustrating operations 500 of a method for background task scheduling based on shared background bandwidth according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by block storage service 102 of the other figures.

The operations 500 include, at block 502, receiving a request to perform one or more background tasks on a storage server of a storage service in a provider network. In some embodiments, receiving the request to perform one or more background tasks can include registering, by each of the one or more background tasks, with a background scheduler on the storage server. In some embodiments, each background task is associated with a data structure defining a maximum duration value, a remaining size value, and a deadline value associated with the background task.

The operations 500 further include, at block 504, determining a priority of each of the one or more background tasks, wherein each background task is associated with a size parameter and a temporal parameter, and wherein the priority of each of the one or more background tasks is based at least on its associated size parameter and temporal parameter. In some embodiments, determining a priority of each of the one or more background tasks may include for each background task, dividing the background task's current value of the size parameter by a difference between the temporal parameter and a current time. In some embodiments, determining a priority of each of the one or more background tasks may include determining a first background task has exceeded its time to be completed based on its temporal parameter, and combining a throughput parameter, representing a maximum network speed, with a difference of a current time and the temporal parameter divided by a maximum duration value associated with the first background task.

The operations 500 further include, at block 506, determining a task type associated with each background task. The operations 500 further include, at block 508, adding each background task to one of a plurality of task queues associated with different task types, wherein each task queue is associated with a bandwidth allocation. In some embodiments, a first queue from the plurality of queues includes background tasks of a first task type, and wherein a second queue from the plurality of queues includes background tasks of all other task types.

The operations 500 further include, at block 510, scheduling the one or more background tasks to be performed based on their priority. In some embodiments, scheduling the one or more background tasks may include fetching background tasks from the plurality of task queues according to the bandwidth allocation of each of the task queues. In some embodiments, fetching background tasks may include determining a number of tokens in a global token bucket on the storage server, and fetching a first amount of background tasks from a first queue and a second amount of background tasks from a second queue based on a first counter associated with the first queue and a second counter associated with the second queue.

In some embodiments, fetching background tasks from the plurality of task queues based on a portion of background bandwidth associated with each of the plurality of task queues, may include determining a global token bucket has an insufficient number of tokens, determining a number of tokens in a shared token bucket, the shared token bucket associated with foreground bandwidth, and fetching a first amount of background tasks from a first queue and a second amount of background tasks from a second queue based a first counter associated with the first queue and a second counter associated with the second queue.

In some embodiments, the operations may include receiving a request to perform a plurality of background tasks on a storage server of a storage service in a provider network, registering each background task with a background scheduler on the storage server, each background task associated with a data structure indicating a maximum duration, job size, and deadline associated with the background task, determining a background task type associated with each background task, adding the plurality of background tasks to a plurality of queues based on each background task's background task type, determining a priority of each of the plurality of background tasks based on the data structure associated with each background task, and dequeuing the plurality of background tasks from the plurality of queues based on their priority. In some embodiments, dequeuing the plurality of background tasks from the plurality of queues based on their priority, may include fetching input/output requests associated with the plurality of background tasks from the plurality of queues based on a bandwidth allocation ratio, and sending the input/output requests to a background throttle manager for execution. In some embodiments, the plurality of background tasks include snapshotting, replication, or transferring data from a storage location into a block storage volume.

Figure 6:
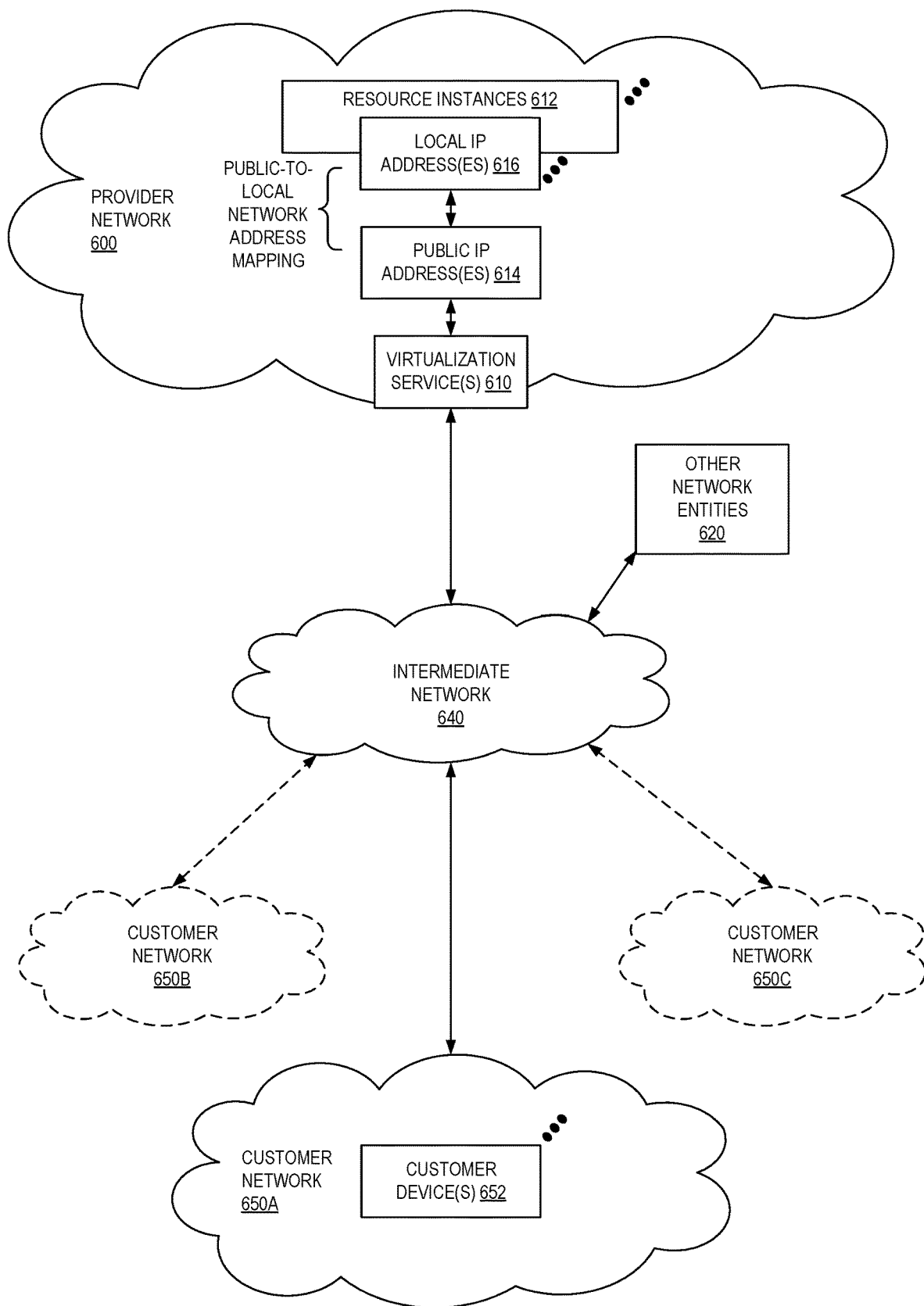
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
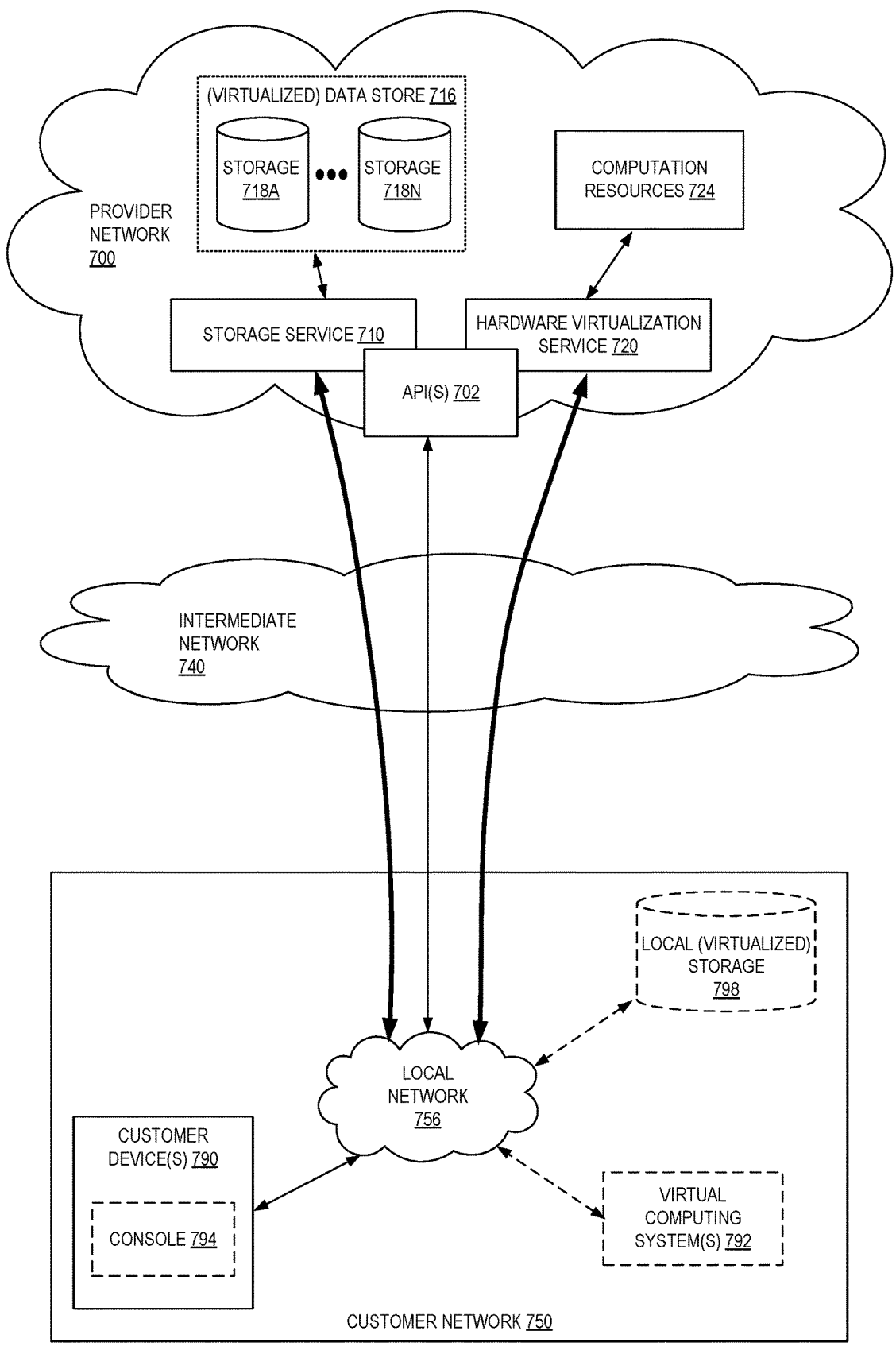
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Illustrative Systems

Figure 8:
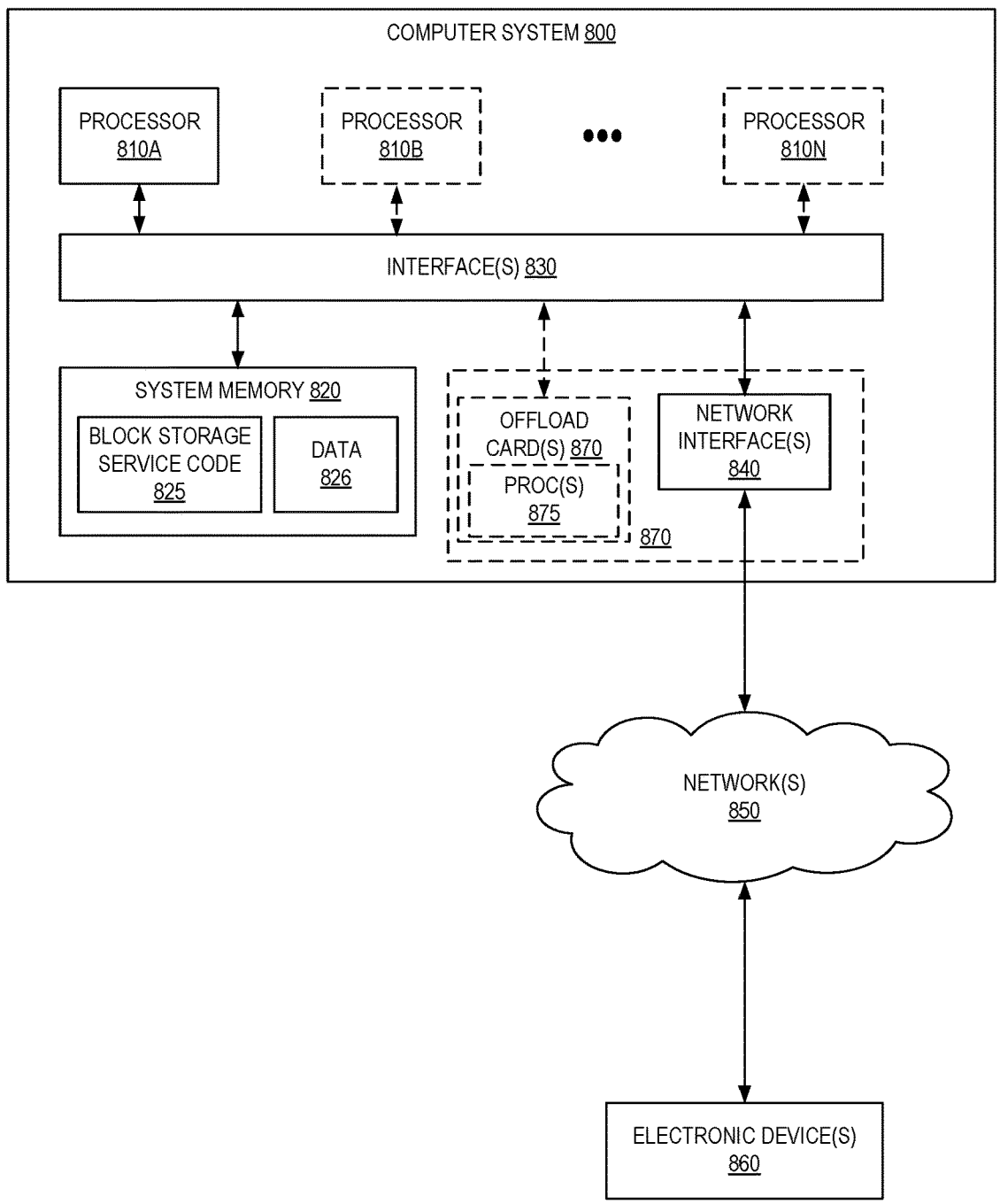
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as block storage service code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving a request to perform a plurality of background tasks on a storage server of a storage service in a provider network;
    registering each background task with a background scheduler on the storage server, each background task associated with a data structure indicating a maximum duration, job size, and deadline associated with the background task;
    determining a background task type associated with each background task;
    adding the plurality of background tasks to a plurality of queues based on each background task's background task type;
    determining a priority of each of the plurality of background tasks based on the data structure associated with each background task; and
    dequeuing the plurality of background tasks from the plurality of queues based on their priority.

2. The computer-implemented method of claim 1, wherein dequeuing the plurality of background tasks from the plurality of queues based on their priority, further comprises:
    fetching input/output requests associated with the plurality of background tasks from the plurality of queues based on a bandwidth allocation ratio; and
    sending the input/output requests to a background throttle manager for execution.

3. The computer-implemented method of claim 1, wherein the plurality of background tasks include snapshotting, replication, or transferring data from a storage location into a block storage volume.

4. A computer-implemented method comprising:
    receiving a request to perform one or more background tasks on a storage server of a storage service in a provider network;
    determining a priority of each of the one or more background tasks, wherein each background task is associated with a size parameter and a temporal parameter, and wherein the priority of each of the one or more background tasks is based at least on its associated size parameter and temporal parameter;

determining a task type associated with each background task;

adding each background task to one of a plurality of task queues associated with different task types, wherein each task queue is associated with a bandwidth allocation; and scheduling the one or more background tasks to be performed based on their priority and the bandwidth allocation.

5. The computer-implemented method of claim 4, wherein receiving a request to perform one or more background tasks on a storage server of a storage service in a provider network, further comprises:

registering, by each of the one or more background tasks, with a background scheduler on the storage server.

6. The computer-implemented method of claim 4, wherein a first queue from the plurality of queues includes background tasks of a first task type, and wherein a second queue from the plurality of queues includes background tasks of all other task types.

7. The computer-implemented method of claim 6, wherein scheduling the one or more background tasks to be performed based on their priority and the bandwidth allocation, further comprises:

fetching background tasks from the plurality of task queues according to the bandwidth allocation of each of the task queues.

8. The computer-implemented method of claim 7, wherein fetching background tasks from the plurality of task queues based on a portion of background bandwidth associated with each of the plurality of task queues, further comprises:

determining a number of tokens in a global token bucket on the storage server; and fetching a first amount of background tasks from a first queue and a second amount of background tasks from a second queue based on a first counter associated with the first queue and a second counter associated with the second queue.

9. The computer-implemented method of claim 7, wherein fetching background tasks from the plurality of task queues based on a portion of background bandwidth associated with each of the plurality of task queues, further comprises:

determining a global token bucket has an insufficient number of tokens;

determining a number of tokens in a shared token bucket, the shared token bucket associated with foreground bandwidth; and fetching a first amount of background tasks from a first queue and a second amount of background tasks from a second queue based a first counter associated with the first queue and a second counter associated with the second queue.

10. The computer-implemented method of claim 4, wherein determining a priority of each of the one or more background tasks, wherein each background task is associated with a size parameter and a temporal parameter, and wherein the priority of each of the one or more background tasks is based at least on its associated size parameter and temporal parameter, further comprises:

for each background task, dividing the background task's current value of the size parameter by a difference between the temporal parameter and a current time.

11. The computer-implemented method of claim 4, wherein determining a priority of each of the one or more background tasks, wherein each background task is associated with a size parameter and a temporal parameter, and wherein the priority of each of the one or more background tasks is based at least on its associated size parameter and temporal parameter, further comprises:

determining a first background task has exceeded its time to be completed based on its temporal parameter; and combining a throughput parameter, representing a maximum network speed, with a difference of a current time and the temporal parameter divided by a maximum duration value associated with the first background task.

12. The computer-implemented method of claim 4, wherein each background task is associated with a data structure defining a maximum duration value, a remaining size value, and a deadline value associated with the background task.

13. A system comprising:

a first one or more electronic devices to implement a hardware virtualization service in a multi-tenant provider network; and a second one or more electronic devices to implement a block storage service in the multi-tenant provider network, the block storage service including instructions that upon execution cause the block storage service to:

receive a request to perform one or more background tasks on a storage server of the block storage service;

determine a priority of each of the one or more background tasks, wherein each background task is associated with a size parameter and a temporal parameter, and wherein the priority of each of the one or more background tasks is based at least on its associated size parameter and temporal parameter;

determine a task type associated with each background task;

add each background task to one of a plurality of task queues associated with different task types, wherein each task queue is associated with a bandwidth allocation; and schedule the one or more background tasks to be performed based on their priority.

14. The system of claim 13, wherein to receive a request to perform one or more background tasks on a storage server of the block storage service, the instructions, when executed, further cause the block storage service to:

register, by each of the one or more background tasks, with a background scheduler on the storage server.

15. The system of claim 13, wherein a first queue from the plurality of queues includes background tasks of a first task type, and wherein a second queue from the plurality of queues includes background tasks of all other task types.

16. The system of claim 15, wherein to schedule the one or more background tasks to be performed based on their priority and the bandwidth allocation, the instructions, when executed, further cause the block storage service to:

fetch background tasks from the plurality of task queues according to the bandwidth allocation of each of the task queues.

17. The system of claim 16, wherein to fetch background tasks from the plurality of task queues based on a portion of background bandwidth associated with each of the plurality of task queues, the instructions, when executed, further cause the block storage service to:

determine a number of tokens in a global token bucket on the storage server; and fetching a first amount of background tasks from a first queue and a second amount of background tasks from a second queue based on a first counter associated with the first queue and a second counter associated with the second queue.

18. The system of claim 16, wherein to fetch background tasks from the plurality of task queues based on a portion of background bandwidth associated with each of the plurality of task queues, the instructions, when executed, further cause the block storage service to:
determine a global token bucket has an insufficient number of tokens;
determine a number of tokens in a shared token bucket, the shared token bucket associated with foreground bandwidth; and
fetching a first amount of background tasks from a first queue and a second amount of background tasks from a second queue based a first counter associated with the first queue and a second counter associated with the second queue.

19. The system of claim 13, wherein to determine a priority of each of the one or more background tasks, wherein each background task is associated with a size parameter and a temporal parameter, and wherein the priority of each of the one or more background tasks is based at least on its associated size parameter and temporal parameter, the instructions, when executed, further cause the block storage service to:
for each background task, divide the background task's current value of the size parameter by a difference between the temporal parameter and a current time.

20. The system of claim 13, wherein to determine a priority of each of the one or more background tasks, wherein each background task is associated with a size parameter and a temporal parameter, and wherein the priority of each of the one or more background tasks is based at least on its associated size parameter and temporal parameter, the instructions, when executed, further cause the block storage service to:
determine a first background task has exceeded its time to be completed based on its temporal parameter; and
combine a throughput parameter, representing a maximum network speed, with a difference of a current time and the temporal parameter divided by a maximum duration value associated with the first background task.

* * * * *